Nov. 17, 1970  J. A. JERDONEK  3,541,294
STUD WELDING
Filed Feb. 7, 1968
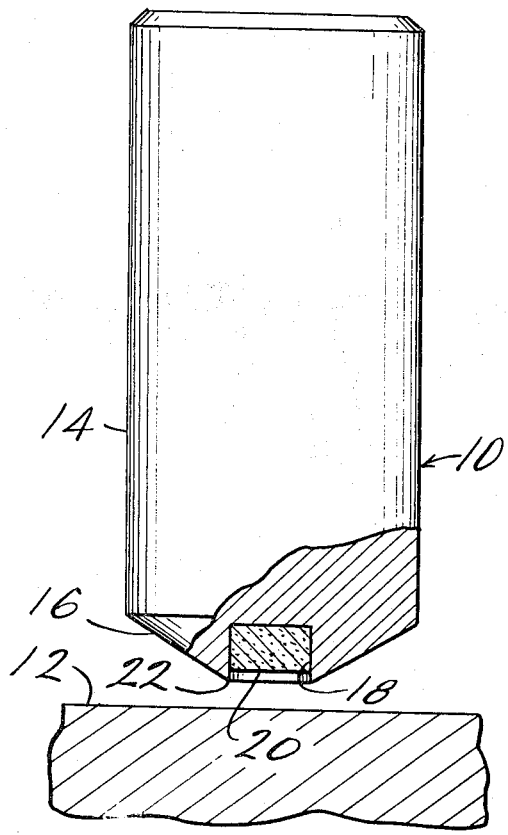
FIG-1-
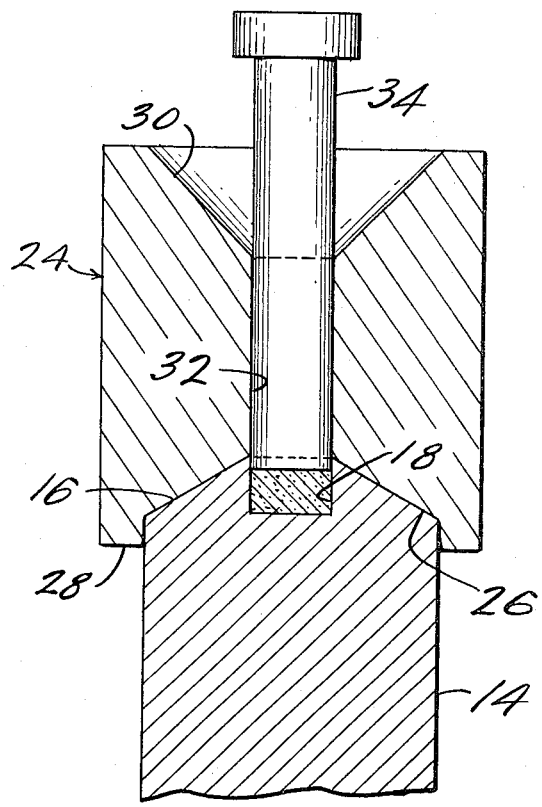
FIG-2-
INVENTOR:
JOSEPH A. JERDONEK.
BY
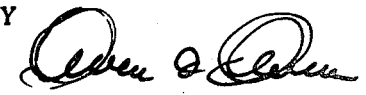
ATT'YS.

United States Patent Office 3,541,294
Patented Nov. 17, 1970

3,541,294
STUD WELDING
Joseph A. Jerdonek, Parma, Ohio, assignor, by mesne assignments, to TRW Inc., Cleveland, Ohio, a corporation of Ohio
Filed Feb. 7, 1968, Ser. No. 703,614
Int. Cl. B23k 9/20
U.S. Cl. 219—99                                3 Claims

ABSTRACT OF THE DISCLOSURE

Calcium fluoride is used as a flux with a weldable titanium stud designed to be arc welded to a surface of a titanium workpiece. The flux improves the arc stabilization, the uniformity of the weld, and the strength and cleanliness thereof.

This invention relates to welding titanium studs and more particularly to a flux for use with such studs.

Stud welding titanium studs has heretofore been difficult and uniformly satisfactory welds have been virtually impossible to attain. Stability of the welding arc has not been achieved with any consistency and the welds have been weak and the weld metal contaminated.

The instant invention is based on the discovery that calcium fluoride is an effective flux for use in welding titanium studs to a titanium workpiece by an arc welding technique. The welds achieved with the use of such flux have been uniform, strong, and clean, with arc stabilization no longer a problem.

In a preferred form, the calcium fluoride is compacted in a recess centrally located in the end of the stud to be welded to the workpiece. The flux can be compacted under pressure so that it forms an integral body in the recess which cannot be easily jarred or shaken out. The non-conducting flux preferably does not extend to the end of the recess so that the conducting metal end can project closest to the workpiece with the arc struck therebetween.

The nature and amount of the calcium fluoride flux employed is not critical within reasonable limits. The flux can be used in the commercial state, as fluorspar, and can be used in widely varying amounts for any given size of stud. Conventional stud welding techniques can be used to weld the stud to the workpiece with an inert gas, such as argon, used around the stud during the welding, as is known in the art.

It is, therefore, a principal object of the invention to provide stronger, cleaner, and more uniform welds between titanium studs and a titanium workpiece.

Another object of the invention is to provide a calcium fluoride flux for welding titanium studs to titanium workpieces to improve the consistency of the welds.

Other objects and advantages of the invention will be apparent from the following detailed description of a preferred embodiment thereof, reference being made to the accompanying drawing, in which:

FIG. 1 is an enlarged view in elevation, with parts broken away and with parts in section, of a titanium end weldable stud employing calcium fluoride flux; and FIG. 2 is a view on a smaller scale of the stud and components for loading the flux in a recess of the stud.

Referring to FIG. 1, a weldable titanium stud 10 is designed to be affixed by an arc welding technique to a titanium workpiece or surface 12. The stud 10 can be of a variety of shapes but, as shown, includes a generally cylindrical shank 14 terminating in a generally conical or pointed end 16 having a central cylindrical recess 18 where the point or tip of the end 16 otherwise would be.

A body 20 of calcium fluoride flux is located in the recess 18 and preferably is below an annular ridge or edge 22 formed between the recess 18 and the surface 16. By recessing the body 20 of flux, the ridge 22 is closest to the titanium workpiece 12 so that the welding arc will be struck between two conducting objects. Otherwise, if the flux body 20 protruded from the recess 18, as has heretofore been the usual practice, the arc would not tend to be struck between the workpiece and the flux, which is non-conducting. Also, by having a conical end, more of the end of the stud will burn off during the end welding process to assure that none of the recess 18 will be left, which otherwise would leave a void or "pipe effect" in the center of the weld. The recess should be of sufficient depth so that the flux can be of a sufficient thickness to form an integral body when compacted. In a one-half inch diameter stud, for example, the recess preferably is about 0.045 to 0.050 inch deep, with a diameter of one-eighth inch.

The amount of the calcium fluoride flux employed can vary considerably with good welds still resulting. Particularly, a substantial excess of calcium fluoride can be employed without affecting the welds. In a typical example, with the one-half inch titanium stud mentioned before, twenty milligrams of the calcium fluoride can be employed. Further, the commercial quality or purity of the calcium fluoride does not appear to be critical. Again, by way of example, fluorspar is as effective in producing high quality welds as chemically pure calcium fluoride.

The flux also can be employed between the stud end 16 and the surface of the workpiece 12 by being dusted on the workpiece or coated on the end of the stud. However, placing the flux in the recess is preferred since no additional preparation need be made prior to welding the titanium stud. Further, the flux, by being compacted under enough pressure, remains in the recess as a self-sustaining, integral body without the use of binders.

The flux can be added to the stud 10 with the equipment shown in FIG. 2. In this instance, with the recess 18 of the stud facing upwardly, a loading and compacting body 24 is placed over the end 16 of the stud. The body 24 has a conical recess 26 cooperating with the end 16 and has an annular flange 28 extending downwardly to further center the body 24 with respect to the recess 18. The body 24 also has an upper funnel-shaped recess 30 and a central passage 32 extending vertically therethrough and of the same diameter as the recess 18.

A predetermined quantity of the calcium fluoride flux is placed in the recess 30, being measured by a small scoop, for example. A ram 34 is then inserted in the passage 32 and approximately one thousand pounds of force placed thereon to provide a pressure of approximately 82,000 p.s.i., which causes the flux to be fully compacted in the recess as an integral body without the use of binders which could contaminate the flux and the weld.

The stud can be welded to the workpiece by the conventional end welding technique. The stud is placed with the ridge 22 in contact with the workpiece 12 and is then withdrawn. An electrical potential is established between the stud and the workpiece as the stud is withdrawn to establish a pilot arc therebetween. Subsequently, a heavier welding arc is established between the stud and the workpiece and the stud is then plunged against the workpiece to complete the weld. An inert gas is employed around the stud and the workpiece during welding, as is known in the art. By way of example, eight cubic feet per hour of argon gas can be supplied around the stud and the workpiece with the use of a gas adapter of the type shown in Gregory Patent 2,727,123 for example.

Various modifications of the above-described embodiment of the invention will be apparent to those skilled in the art, and it is to be understood that such modifications can be made without departing from the scope of the invention, if they are within the spirit and the tenor of the accompanying claims.

I claim:
1. A welding stud of titanium metal said stud having a generally conical end, a recess in said end where the point would otherwise be, and a flux of calcium flouride partially filling the recess leaving a space between the flux and the surface at the end of the stud, the remaining surface of the stud being free of an amount of flux which would act as an insulator thereby preventing the drawing of an arc between the workpiece and the stud.

2. A stud according to claim 1 wherein said recess is cylindrical and forms an annular ridge at the juncture with the surface of said conical end.

3. A stud according to claim 1 wherein said flux is in a compacted, integral state in said recess.

References Cited

UNITED STATES PATENTS

| | | | |
|---|---|---|---|
| 1,882,601 | 10/1932 | Hollup | 219—146 X |
| 2,727,123 | 12/1955 | Gregory | 219—98 |
| 2,993,982 | 7/1961 | Glover | 219—99 |
| 3,313,912 | 4/1967 | Pease | 219—98 X |

JOSEPH V. TRUHE, Primary Examiner

R. O'NEILL, Assistant Examiner